United States Patent Office 3,719,724
Patented Mar. 6, 1973

3,719,724
RAPID CURING RESIN COMPOSITIONS COMPRISING A MODIFIED ALDEHYDE CONDENSATION POLYMER COREACTED WITH AN EPOXIDE-ALDEHYDE MIXTURE
Harlan G. Freeman, Seattle, Wash., assignor to Weyerhaeuser Company, Tacoma, Wash.
No Drawing. Continuation-in-part of application Ser. No. 821,999, May 5, 1969. This application Mar. 29, 1971, Ser. No. 129,240
Int. Cl. C08g 37/38, 45/08, 45/10
U.S. Cl. 260—828
22 Claims

ABSTRACT OF THE DISCLOSURE

This invention describes reaction products having particular utility as low temperature rapid curing adhesives for wood and other materials, and processes for making the adhesive compositions. The reaction products are made by reacting (1) an aldehyde condensation polymer having reactive alkylol groups such as a phenol-formaldehyde polymer, with (2) amines such as primary aromatic amines, bis(aminoaryl) compounds, primary aminonaphthalenes, and certain heterocyclic nitrogen-containing compounds, to obtain an amine-modified polymer. On blending a curing agent comprising an epoxide-aldehyde mixture with the amine-modified polymers the resulting resin compositions cure very rapidly at ambient temperature to form insoluble, infusible polymers. When pieces of wood are spread with the preferred adhesives employing the resins of this invention and brought into contact with another wood surface the bond strength develops within minutes. The durability, strength and flexibility of the cured adhesives of this invention under adverse weathering conditions are excellent.

CROSS REFERENCE

This application is a continuation-in-part of application Ser. No. 821,999 filed on May 5, 1969, now abandoned.

BACKGROUND OF THE INVENTION (1) Field of the invention

This invention relates to the preparation of rapid curing resinous compositions, to the compositions per se, and to the use of the compositions as adhesives.

(2) Prior art relating to the invention

For many years the adhesives used to bond wood together to make plywood, laminated beams, furniture, etc., have employed aldehyde condensation polymers of phenol, urea, resorcinol, etc., such as phenol-formaldehyde resins, resorcinol-formaldehyde resins, phenol-resorcinol-formaldehyde resins, urea-formaldehyde resins, and others. Although each of these resins has advantageous characteristics, they all have relatively slow curing rates.

The relatively slow cure rates of these resins have necessitated long press times with concurrent restriction on production when used in the manufacture of laminated beams, plywood and other construction uses. To overcome the slow cure rates many modifications of the above resins have been proposed. Other resins, such as the epoxies, have been proposed, but their expense and certain of their physical properties have limited their use. The resins of this invention are aldehyde condensation polymers modified with particular amines. These resins not only have rapid cure rates but, as adhesives, develop adequate bond strengths in a short amount of time at ambient temperature, thereby eliminating the need for long press times and application of heat to develop sufficient bond strength.

Greenlee in U.S. Patent 2,511,913 describes resin compositions which are reaction products of aromatic amines and aldehydes with polyepoxides to give compositions useful for varnishes, molding, compounds, adhesives, etc. One example shows an aniline-phenol-aldehyde resin suitable as a curing agent for an epoxide upon the application of heat to the mixture.

In U.S. Patent 3,186,969, Cox et al. show intermediate products which are further reacted with compounds containing the oxirane group to form vicinal epoxides. The intermediate products are formed from the reaction of an aromatic primary amine, a phenol and an aldehyde. The reaction conditions are carefully controlled to avoid any condensation between the phenol and aldehyde.

Other patents show the use of aromatic or heterocyclic amine-aldehyde condensation products as curing agents for epoxy resins. Exemplary of these are Smith, U.S. 3,071,559; Graham, U.S. 3,315,010 and Salinsky, 3,383,-433. The amine used by Graham is o-toluidine while Smith prefers m-chloroaniline. Salinsky teaches compositions of a phenolic novolac with an imidazole, a triazole or a tetrazole.

Amines, particularly primary and secondary aliphatic amines, are well known as curing agents for epoxy resins. Adducts of a phenolic resin with a polyamine compound as a curing agent for epoxy resins are disclosed in Canadian Patent No. 662,682. By using these adducts the "pot life" of the epoxy resin is extended.

SUMMARY OF THE INVENTION

This invention relates to the preparation of rapid curing resin compositions, to the resin compositions per se, and to the use of the resins as adhesives. Common to the various embodiments of this invention is the reaction product of (a) an epoxide-aldehyde mixture with (b) an amine-modified aldehyde condensation polymer having reactive alkylol groups. More particularly, the compositions of this invention are prepared by reacting together an aldehyde condensation polymer having reactive alkylol groups, with amines of the following types:

(1) Primary aromatic amines having the formula:

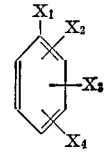

where:

$X_1$ is

—NH$_2$
    —CH$_2$NH$_2$ $X_2$ is

—$X_1$
    —OH
    —alkoxy $X_3$ is

—$X_1$
    —COOH
    —NO$_2$
    —alkoxy
    —OH
    —Cl to C$_5$ alkyl
    —NHCOCH$_3$
    —H

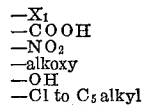

—halogen
    —halogenated alkyl $X_4$ is

—$C_1$ to $C_4$ alkyl
—H
—aryl and A is

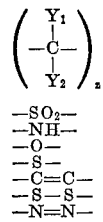

—$SO_2$—
—NH—
—O—
—S—
—C=C—
—S—S—
—N=N— where $Y_1$ and $Y_2$ are hydrogen or alkyl radicals having from 1 to 3 carbon atoms and Z is an integer from 0 to 2;

(2) Bis(aminoaryl) compounds having the formula:

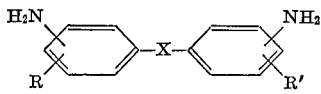

where
R and R' are alkoxy, amino, hydrogen, hydroxyl, nitro, carboxyl or $C_1$ to $C_4$ alkyl and
X is

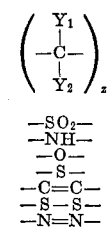

—$SO_2$—
—NH—
—O—
—S—
—C=C—
—S—S—
—N=N— where $Y_1$ and $Y_2$ are hydrogen or alkyl radicals having from 1 to 3 carbon atoms and Z is an integer ranging from 0 to 2;

(3) Primary aminonaphthalenes having the formula:

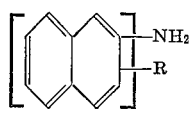

where R may be amino in any open ring position or hydroxyl in the 2, 5 and 8 ring positions when the amino group is in the 1 position; and (4) Five and six-membered heterocyclic nitrogen-containing compounds selected from the group consisting of 2,3-, 2,4-, 2,6- and 3,4-diaminopyridine; 4,6-diaminopyrimidine; pyrrole; 2,4 - dimethylpyrrole and N - methylpyrrole.

The resulting reaction product is then blended with a hardener comprising an epoxide-aldehyde mixture, the hardener being present in an amount sufficient to cause the resin to cure to an insoluble, infusible state. On addition of the epoxide-aldehyde mixture the resin composition cures at ambient temperature within minutes.

The compositions can be used to bond wood to wood, metal to metal, wood to metal, fabric and many other materials where durable, moisture-resistant, fire-resistant adhesive compositions are needed.

DESCRIPTION OF THE PREFERRED EMBODIMENTS

Many of the aldehyde condensation polymers of phenol resorcinol, urea, and melamine have been widely used as adhesives and their properties are well known. Epoxide resins are also known as high strength adhesives. The particular combination of resins of this invention takes advantage of the properties of the aldehyde condensation polymers and properties of the epoxide resins, and results in adhesive compositions which set to an insoluble, infusible state in a very short amount of time at ambient temperature.

The aldehyde condensation polymers which can be used in this invention have reactive alkylol groups, and are well known and commercially available. "Polymers," as used herein, means resinous mixtures not capable of crystallization nor having a sharp melting point. "Reactive alkylol groups" are alkylol groups capable of reacting with the primary aromatic amines used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins, acetonealdehyde resins, etc. The following references disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press, Ltd., London, England; and British Patent 480,316.

Specifically, the aldehyde condensation polymers which can be used include (1) phenoplasts comprising the condensation polymers of an aldehyde such as formaldehyde with a phenolic type material such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methyl isobutyl ketone formaldehyde, and the like. The preferred resins are water-soluble, liquid, thermosetting phenol-aldehyde resins.

A preferred resin is an ortho-condensed phenol-formaldehyde resin made by condensing 0.7 to 1.0 mole formaldehyde with 1 mole phenol in the presence of an ortho-directing catalyst such as calcium acetate. Such resins are known and disclosed in British Patent No. 615,335. Each of the aldehyde condensation polymers mentioned above is prepared and kept under conditions which prevent it from condensing to an infusible state by known methods. Although phenol is the preferred reactant, the phenolic resins may be modified by incorporating into them predetermined amounts of a dihydric phenol such as resorcinol, or other polyhydroxy aromatic compounds.

The aldehyde used in preparation of the condensation polymer may be (1) monofunctional (i.e. a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene, glyoxal or trioxane, may be accomplished with the use of a mildly acid, alkaline, or no catalyst. When using acrolein, acetaldehyde, propionaldehyde, or butyraldehyde, condensation may be accomplished by combining the reactants in the presence of a strongly acid catalyst, neutralizing the reaction product, adding more aldehyde, and further reacting in the presence of a mildly acid, or alkaline, catalyst. Glyoxal may also be condensed in the latter manner.

The aldehyde condensation polymers mentioned above are modified by reaction with a primary aromatic amine to give an amine-modified polymer. It is necessary, in order to produce the low-temperature fast curing products of this invention, to first produce the aldehyde condensation polymer and then subsequently modify that polymer with the primary aromatic amine. Simultaneous reaction of all the reactants, i.e., phenol, formaldehyde and amine, produces an inferior, heterogeneous mass, i.e., comprising essentially an amine-formaldehyde condensation polymer containing free phenol.

The amount of amine used to react with the condensation polymer may range from about 0.05 to 2.0 parts by weight of the amine to each part of the condensation polymer and preferably 0.1 to 1.0 part by weight of the amine to each part of the condensation polymer. More than 2.0 parts by weight of the amine to each part of the aldehyde condensation polymer can be used but there is little advantage in doing so. Most of the amines disclosed react with the aldehyde condensation polymers at room temperature, but to insure complete reaction the mixtures are usually heated to reflux. Many of these reactions are exothermic in nature and cooling is required to control the reaction. This exothermic nature of the reaction is in some instances controlled by slow addition of the amine to the prepared polymer. It may be desirable under some circumstances, however, to add the polymer to a solution of the amine. When the resin is ready to be used a curing agent is blended therein.

The amines useful for modifying the aldehyde condensation polymers include amines of the following types:

(1) Primary aromatic amines having the formula:

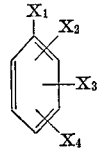

where:
$X_1$ is

—$NH_2$
—$CH_2NH_2$ $X_2$ is

—$X_1$
—OH
—alkoxy $X_3$ is

—$X_1$
—COOH
—$NO_2$
—alkoxy
—OH
—$C_1$ to $C_5$ alkyl
—$NHCOCH_3$
—H

—halogen
—halogenated alkyl $X_4$ is $C_1$ to $C_4$ alkyl
—H
—aryl and
A is

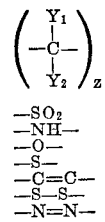

—$SO_2$
—NH—
—O—
—S—
—C=C—
—S—S—
—N=N— where $Y_1$ and $Y_2$ are hydrogen or alkyl radicals having from 1 to 3 carbon atoms and Z is an integer from 0 to 2;

(2) Bis(aminoaryl) compounds having the formula:

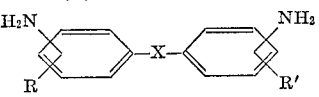

where
R and R' are alkoxy, amino, hydrogen, hydroxyl, nitro, carboxyl or $C_1$ to $C_4$ alkyl and
X is

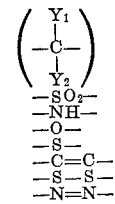

—$SO_2$—
—NH—
—O—
—S—
—C=C—
—S—S—
—N=N— where $Y_1$ and $Y_2$ are hydrogen or alkyl radicals having from 1 to 3 carbon atoms and Z is an integer ranging from 0 to 2;

(3) Primary aminonaphthalenes having the formula:

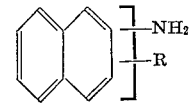

where R may be amino in any open ring position or hydroxyl in the 2, 5 and 8 ring positions when the amino group is in the 1 poosition; and (4) Five and six-membered heterocyclic nitrogen-containing compounds selected from the group consisting of 2,3-, 2,4-, 2,6- and 3,4-diaminopyridine; 4,6-diaminopyrimidine; pyrrole; 2,4-dimethylpyrrole and N-methylpyrrole.

The following amines are exemplary of those that may be used in the preparation of these resins:

4-aminosalicylic acid
3,5-diaminobenzoic acid
o-hydroxyaniline
m-hydroxyaniline
o-phenylenediamine
m-phenylenediamine
p-phenylenediamine
1,2,4-triaminobenzene
1,3,5-triaminobenzene
2-amino-5-nitrophenol
1,3-diamino-4-methoxybenzene
1,3-diamino-4-nitrobenzene
1,4-diamino-2-nitrobenzene
2,4-diaminophenol
2,4-diaminotoluene
2,4-diaminoacetanilide
m-xylylenediamine
3,3'-dimethoxybenzidine
4,4'-oxydianiline
o-tolidine
4,4'-diaminodiphenylmethane
4,4'-diaminodiphenylsulfone
3,3'-diaminobenzidine
4,4'-diaminodiphenylamine
4,4'-diaminostilbene
4,4'-methylenedianiline
4,4'-diaminodiphenyldisulfide
1,5-diaminonaphthalene
1,8-diaminonaphthalene
1-amino-5-naphthol
1-amino-2-naphthol
1,3-diamino-4-chlorobenzene
2,7-diaminonaphthalene 1,2-diaminonaphthalene
2,4,6-triaminotoluene
2,4-diaminodiphenylamine
2-aminoresorcinol
m-methoxyaniline
2,6-diaminopyridine
N-methylpyrrole
pyrrole
4,6-diaminopyrimidine
2,3-diaminopyridine
2,4-dimethylpyrrole
3,4-diaminopyridine
2,4-diaminopyridine The preferred amines from the standpoint of economics and adhesive properties include m-hydroxyaniline, m-phenylenediamine, 1,5-diaminonaphthalene, 2,6-diaminopyridine and 4,4'-methylenedianiline.

The amine-modified aldehyde condensation polymers useful in this invention are generally prepared by reacting the amine compounds described with previously prepared aldehyde condensation polymer, usually under reflux conditions, in the presence of a small amount of water, methanol, water-methanol mixture, or other suitable carrier vehicle. As most of the reactions are exothermic in nature, cooling is frequently required. The reaction is best controlled by the slow addition of the amine compound to the polymer or vice versa. The amine-modified aldehyde condensation polymers described above make up this first component of the resin composition. The first component is prepared so as to have a relatively long storage life so it can be shipped and stored for fairly long periods of time without gelation.

The second component of the resin composition is an epoxide curing agent comprising an epoxide-aldehyde mixture which is blended with the amine-modified aldehyde condensation polymer. The epoxide and aldehyde are preferably added simultaneously to the amine-modified condensation polymer, although the epoxide may be added prior to the aldehyde donor if desired. Reaction takes place at ambient temperature and the blended mixture gels rapidly to an insoluble infusible state. The preferred resins of this invention set to an insoluble infusible state within minutes. The "gel time" of the resin compositions is pH dependent to a certain extent, the pH effect depending primarily on the particular amine being used but also on the solvent vehicle used and the concentration of the amine. The optimum pH for the desired gel time can be determined by a skilled technician by determining the "gel time" of the particular composition at different pH levels.

"Insoluble" is intended to mean not soluble in common solvents such as water, alcohols, ketones, hydrocarbons, esters, glycols, and the like. Optionally, heat may be applied to the curing composition if desired to further decrease the required cure time.

In the epoxide-aldehyde curing agent, the epoxide can constitute as little as 10 parts by weight or as much as 50 parts by weight to about 90 to 50 parts by weight of the amine-modified aldehyde condensation polymer. Preferably, between 10 and 30 parts by weight of the curing agent is used to 90 to 70 parts by weight of the amine-modified aldehyde condensation polymer. The amount of aldehyde in the mixture may range from 0.02 to 2.0 parts by weight aldehyde per part of amine-modified condensation polymer. Preferably, the aldehyde is formaldehyde, though the formaldehyde-forming compounds polyoxymethylene, trioxane and paraformaldehyde are quite satisfactory. Other aldehydes may be also used, for example, aliphatic or cyclic aldehydes having from 1 to 8 carbon atoms such as acrolein, glyoxal, acetaldehyde, propionaldehyde, butyraldehyde, and furfuraldehyde. Phenolic resoles and other similar polymers having free methylol groups are also efficient curing agents.

A wide variety of epoxide compounds can be used to prepare the compositions of this invention. They can be saturated or unsaturated, aliphatic, cycloaliphatic, aromatic, or heterocyclic, and monomeric or polymeric in nature. The polyepoxide resins include alicyclic polyepoxides such as vinylcyclohexene dioxides, limonene dioxide, dicyclopentadiene oxide, ethylene-glycol-bis(3,4-epoxytetrahydro-dicyclopentadiene - 8 - yl)-ether, (3,4-epoxy - tetrahydro-dicyclo-pentadiene-8-yl)-glycidyl ether; epoxidized polybutadienes or copolymers of butadiene with ethylenically unsaturated compounds such as styrene or vinyl acetate; compounds containing 2 epoxy-cyclohexyl residues such as diethylene glycol-bis-(3,4-epoxycyclohexane-carboxylate), bis-3,4-epoxy-cyclohexylmethyl succinate, 3,4-epoxy-6-methylcyclohexylmethyl-3,4-epoxy-6-methylcyclohexane-carboxylate, and 3,4-epoxy-hexahydrobenzal-3,4 - epoxy-cyclohexane-1,1-dimethanol. Epoxidized esters, for example, epoxidized unsaturated vegetable oils, epoxidized soy bean oil, and epoxidized glycerol trilinoleate may be used. Also polymers and copolymers of vinyl polymerizable monepoxides such as allyl glycidyl ether, glycidyl acrylate and glycidyl methacrylate may be used. Polyglycidyl esters resulting from the reaction of a dicarboxylic acid with epichlorohydrin or glycerol dichlorohydrin in the presence of an alkali may also be used. These polyesters are derived from aliphatic dicarboxylic acids such as succinic or adipic acid or from aromatic dicarboxylic acids such as phthalic or terephthalic.

Additional polyepoxides used in the compositions of this invention include glycidyl ethers of polyhydric phenols, obtained by reacting a polyhydric phenol with an excess of epichlorohydrin in the presence of sodium hydroxide. Such polyhydric phenols include bisphenol A 2,2-bis(p-hydroxyphenyl)propane, resorcinol, hydroquinone, 4,4'-dihydroxybenzophenone, bis(4-hydroxyphenyl) ethane, 1,5-dihydroxynaphthalene, 4,4'-dihydroxybiphenyl and condensation products of phenol with formaldehyde such as resoles or novolacs containing more than 2 phenol moieties linked to methylene bridges, and the like. Also polyglycidyl ethers of polyhydric alcohols may be used. These are made by reacting of polyhydric alcohol and epichlorohydrin with an acidic catalyst such as boron trifluoride and subsequently treating the resulting product with an alkaline material. Included among the polyhydric alcohols that can be used in the preparation of these polyepoxides are glycerine, ethyleneglycol, propylene-glycol, diethyleneglycol, hexanetriol, pentaerythritol, trimethylol ethane, trimethylolpropane, and polyhydric ether alcohols such as diglycerol, dipentaerythritol, polyalkylene glycols and hydroxyethers of the aforementioned polyhydric phenols.

Other polyepoxide resins useful in this invention are described in "Handbook of Epoxy Resins" by Lee and Neville, McGraw-Hill Book Company, Incorporated, 1967.

When the first component comprising the amine-modified condensation polymer and the second component comprising the epoxide-aldehyde mixture are mixed together the composition becomes infusible rapidly. When bonding materials together the two components are kept separate until they are needed. They are then intimately mixed and spread on the material to be bonded in suitable manner by any conventional means. An automatic mixing-dispensing gun is most useful in this regard.

Certain of the resin compositions of this invention have such rapid cure times that they begin to cure before they can be spread on the material to be bonded. To overcome this problem the first component can be spread on one surface of the material to be bonded and the second component spread on the second surface to be bonded. Such a process is described, for example, in U.S. Pats. 2,557,826 and 3,476,706 using phenol-resorcinol-formaldehyde resins. When the surfaces are brought into contact the first and second resin components react forming an infusible glue line between the materials.

If desired, other ingredients can be added to the novel compositions before they are cured. Such ingredients include fillers, pigments, plasticizers, and the like in amounts ordinarily employed for such purposes.

The compositions of this invention do not need additional catalyst or heat to cure them. They are curable at ambient temperatures and in very short time periods after mixing of the two compounds. Additionally the resin compositions as adhesives develop bond strengths sufficient to hold articles together within minutes.

The following examples illustrate this invention. Parts and percents where used are intended to be parts and percents by weight, unless otherwise specified. Cure rate was determined by means of "gel" time. Gel time was determined by weighing out a 10 gm. aliquot of the first resin component, adjusting the pH to the desired point, and mixing the second resin component with the first component. The time elapsed from mixing to gelling of the resin composition is termed "gel time."

EXAMPLE 1

Preparation of a predominately ortho-condensed phenol-formaldehyde resin modified with m-phenylenediamine A four-liter reactor was charged with the following: 2,174.0 parts phenol, 90.4%; 518.8 parts flake paraformaldehyde, 93.5%; 12.0 parts water; and 21.06 parts calcium acetate monohydrate. The mixture was heated under agitation to reflux in about 60 minutes and refluxed at 110 C. for about two hours. The mixture was then cooled to about 105° and 914.4 parts m-phenylene-diamine added. The mixture was again heated to reflux (105° C.) and heating continued for 2½ hours. It was then cooled to 60° and 718.7 parts methanol added. Cooling was continued to 25° C. and the resin removed to storage.

EXAMPLE 2

Preparation of an epoxy-modified amine-modified resin

A two-component resin, one component comprising the amine-modified condensation polymer of Example 1 and the other component comprising an epoxy resin-formaldehyde mixture were prepared in the following proportions:

Component A:                      Wt. percent
   Meta-phenylenediamine resin of Example 1 __ 93.18
   Concentrated hydrochloric acid to adjust the pH _____ 6.82
Component B:
   55% formaldehyde in methanol-water solution _____ 49.08
   Asbestos filler _____ 1.84
   Epoxy resin made by the epoxidation of a phenol-formaldehyde novolac, the epoxide resin having an average of 2.2 epoxy groups per molecule _____ 49.08

Two parts by weight of Component A were mixed with 1 part by weight of Component B. The mixture gelled within 15 seconds and had good adhesive properties.

EXAMPLE 3

Preparation of a m-hydroxyaniline-modified aldehyde condensation polymer

Parts
A reactor was charged with the following:
Phenol, 100% _____ 45.18
Flake paraformaldehyde, 91% _____ 12.26
Water _____ 4.74
Calcium acetate monohydrate _____ 0.5

Agitation was applied and the mixture heated to reflux (110° C.) in 60 minutes and held under reflux conditions for about 2 hours. The mixture was then slightly cooled and 20.83 parts of m-hydroxyaniline added. The mixture was then again heated to reflux (110° C.) and held for 2½ hours and then cooled to about 60° C. Methanol, 16.49 parts, was then added. The cooling was then continued until room temperature was reached.

EXAMPLE 4

Preparation of a two-component resin using the m-hydroxyaniline resin of Example 3 and an epoxide-aldehyde mixture A two-component adhesive was prepared with the two components having the following formulation:

Component A:                      Wt. percent
   Meta-hydroxyaniline resin of Example 3 _____ 96.47
   Concentrated hydrochloric acid _____ 3.53
Component B:
   55% formaldehyde in methanol-water solution _____ 49.08
   Asbestos _____ 1.84
   Epoxide resin (ERL 3794—Union Carbide)— a polyglycidyl ether of phenol-formaldehyde novolac blended with diglycidyl ether of bisphenol A having an epoxy equivalent wt. of 174–186 and a viscosity of 7000–19,000 cps. at 25° C. _____ 49.08

Two parts by weight of Component A were mixed with one part by weight of Component B to give a rapid curing adhesive having a gel time of 60 seconds.

EXAMPLE 5

The following experiments were conducted to show that the cure rate of the resin compositions of this invention are much faster when the amine-modified condensation polymer is mixed with the epoxy resin than when unmodified aldehyde condensation polymer or amine alone is reacted with the same epoxy resin. In each case the condensation polymer was a predominantly ortho-condensed phenol-formaldehyde resin prepared under substantially the same conditions.

A predominantly ortho-condensed phenol-formaldehyde resin modified with m-hydroxyaniline was prepared by heating under agitation 248.5 parts phenol, 100%; 67.4 parts flake paraformaldehyde, 91%; 26.1 parts water and 2.8 parts calcium acetate monohydrate. The mixture was heated to reflux (110° C.) in about 60 minutes and held under reflux conditions for 2 hours. The reaction mixture was then allowed to cool to 25° C. and left in the reactor overnight. It was then heated to reflux and 114.6 parts m-hydroxyaniline added. Reflux was continued for 2½ hours after which the mixture was cooled to 60° C. At this point 90.7 parts methanol were added and the resin mixture cooled to 25° C. The final resin had a Gardner viscosity of between E and F and a free phenol content of 18.0%.

A similar predominantly ortho-condensed phenol-formaldehyde polymer was prepared by mixing together 42.06 parts by weight of 100% phenol, 11.35 parts by weight of 91% flake paraformaldehyde, 4.51 parts by weight of water, and 0.46 part by weight of calcium acetate monohydrate. This mixture was brought to reflux (100° C.) in about 60 minutes and held under reflux conditions for about 120 minutes. The prepolymer was then cooled to room temperature.

To 47.52 parts of the above ortho-condensed phenol-formaldehyde resin modified with m-hydroxyaniline was added 23.36 parts of an epoxidized phenolic novolac having an average of 2.2 epoxy groups per molecule. The mixture was put in a water bath at 30° C. and the gel time checked. The gel time at 30° C. was 38.6 minutes.

To 29.8 parts of the above predominantly ortho-condensed phenol-formaldehyde prepolymer in 7.85 parts methanol were added 23.36 parts of the epoxide resin described above. Its gel time at 30° C. was greater than two weeks.

To 10.14 parts of m-hydroxyaniline dissolved in 7.85 parts methanol was added 23.36 parts of the same epoxide resin. The gel time at 30° C. was 354.8 minutes.

The gel time resulting from reaction of the epoxide resin with the amine-modified condensation polymer was significantly shorter than when the epoxide resin was reacted with only the condensation polymer or the amine compound.

EXAMPLE 6

Preparation of an acetone-formaldehyde resin modified with m-hydroxyaniline as one component and reacted with an epoxide-aldehyde mixture to give a rapid cure adhesive The following components were added to a reactor: 17,146.1 parts formaldehyde, 50%, 1,270.1 parts water, 4,173.1 parts technical grade acetone. The temperature was adjusted to 40° C. and 45.4 parts of 49.5% sodium hydroxide added. The temperature was adjusted to 30° C. and an additional 45.4 parts of weight percent sodium hydroxide added. The temperature was then allowed to rise uniformly to 65° C. over the next 60 minutes. An exothermic reaction was experienced. A temperature of 65–70° C. was maintained for about 20 minutes at which time the exothermic reaction subsided. The resin was then cooled to 25° and stored. The acetone-formaldehyde resin was characterized by a formaldehyde-acetone molar ratio of about 4.0 and 14.2% free formaldehyde.

To a second reactor was charged 444.4 parts m-hydroxyaniline and 222.5 parts methanol. The mixture was heated to reflux (about 75° C.) and held at that temperature until the m-hydroxyaniline was dissolved. The solution was then cooled to 60° C. and 333.1 parts of the acetone-formaldehyde resin prepared as described above added in small increments to control the heat of reaction. During addition of the acetone-formaldehyde resin to the m-hydroxyaniline-methanol solution the temperature was maintained between 60° and 65° C. After all of the acetone-formaldehyde resin was added and the exothermic reaction had subsided, the mixture was heated to reflux (about 80° C.) and held at reflux for about 30 minutes whereupon it was then cooled to 25° C. The resin had a Gardner viscosity between A1 and A at 25° C.

The acetone-formaldehyde resin modified with m-hydroxyaniline, 2 parts by weight, was blended with 1 part by weight of an epoxy resin-formaldehyde mixture having the following composition: 49.08 wt. percent 55% formaldehyde in methanol-water solution, 1.84 wt. percent asbestos, 49.08 wt. percent of an epoxidized phenol-formaldehyde novolac having an average of 2.2 epoxy groups per molecule. The resulting resin had a gel time of 60 seconds at 25° C. and was used in a standard cross-lap test (see Marra, A., "Geometry as an Independent Variable in Adhesive Joint Studies," For. Prod. Jour., vol. XII, No. 2, pp. 81–90, 1962).

The cross-lap test is conducted by spreading the adhesive incorporating the resin on the central area of a piece of Douglas fir wood 1" wide by approximately ¾" thick and 2¾" long. A similar piece of Douglas fir wood is immediately laid over the first with the grain direction at right angles. A measured quantity of adhesive may be used or an excess may be applied with the surplus allowed to squeeze out of the joint. The latter method has been used for the examples given here. As soon as the cross-lap is laid on the first piece, a pressure of 40 pounds is applied for the desired length of time. The joint is then broken in tension and the bond strength recorded.

Normally wood failure begins to occur at a value of about 150 p.s.i. For many purposes, however, a bond strength well below this value is wholly satisfactory. It should also be noted that strength usually continues to increase significantly for at least a 24-hour period after initial layup.

In the table below the tensile strengths necessary to separate the cross-laps were measured at the end of the indicated press times.

| Minutes press time: | Lbs. per sq. in. |
|---|---|
| 2 | 6 |
| 4 | 56 |
| 6 | 331 |
| 8 | 350 |
| 10 | 438 |
| 12 | 375 |

EXAMPLE 7

Preparation of an amine-modified urea-formaldehyde resin as Component A, further reacted with Component B, an epoxide-formaldehyde mixture A reactor was charged with 444.4 parts m-hydroxyaniline and 222.5 parts methanol and heated to about 75° C. until all of the m-hydroxyaniline had dissolved. The solution was then cooled to 60° C. and 333.1 parts of urea-formaldehyde resin precursor (UF-85, a product of Allied Chemical Co.) added in small increments to control the heat of reaction. The resin precursor is formed using a molar ratio of aldehyde to urea of 4.8:1 It is an essentially nonpolymeric mixture of methylol ureas containing both free urea and free formaldehyde at pH 7.5–8.5. During addition of the urea-formaldehyde the temperature was not allowed to rise above about 68° C. After completing the addition of urea-formaldehyde, the resin was allowed to mix an additional 10 minutes at about 68° C. and the resin then cooled to 25° C. The final viscosity of the resin was between T and U at 25° C. on the Gardner viscosity scale. To the urea-formaldehyde resin modified with m-hydroxyaniline, 2 parts by weight, was added 1 part by weight of the of the epoxide resin-formaldehyde composition described in Example 6. The resin had a gel time of 16 seconds at 25° C. Cross-lap tests were conducted in a manner similar to that described in Example 6 with the following results:

| Minutes press time: | Lbs. per sq. in. |
|---|---|
| 2 | 200 |
| 4 | 325 |
| 6 | 294 |
| 8 | 344 |
| 10 | 400 |
| 12 | 325 |

EXAMPLE 8

Preparation of a urea-formaldehyde resin modified with m-hydroxyaniline as Component A, further reacted with an epoxide formaldehyde mixture To the reactor was charged 444.4 parts of m-hydroxyaniline and 222.5 parts methanol. The mixture was heated to reflux (about 75° C.) and held under reflux conditions until all the m-hydroxyaniline had dissolved. The solution was then cooled to 60° C. and 333.1 grams of urea-formaldehyde resin (AMRES 255, a product of Pacific Resins & Chemicals Co.) added. AMRES 225 is typical of many general purpose liquid urea-formaldehyde adhesive resins readily available on the market. It is made with an approximate 2 to 1 mole ratio of formaldehyde to urea, and is cooked to a Gardner viscosity of U at a pH of 8.0 and contains 65% resin solids in a water solution. Reference is made to the book "Aminoplasts" by C. P. Vale and published by Cleaver-Hume Press, Ltd., London, England, and especially to pages 12–46 for a discusssion of preparation of resins of this type. The temperature was raised to 65° C. and held for 15 minutes whereupon the mixture was cooled to 25° C. and removed to storage. The resin had a final viscosity of between A and B at 25° C. on the Gardner viscosity scale.

Two parts by weight of the above resin was mixed with one part by weight of the epoxide-formaldehyde mixture of Example 6. The blended resin had a gel time of 40 seconds at 25° C. Cross-lap tests conducted in the same manner as described in Example 6 gave the following results:

| Minutes press time: | Lbs. per sq. in. |
|---|---|
| 2 | 0 |
| 4 | 19 |
| 6 | 22 |
| 8 | 63 |
| 10 | 72 |
| 12 | 119 |

EXAMPLE 9

Preparation of an amine-modified melamine-urea-formaldehyde resin as Component A, further reacted with Component B, an epoxide-formaldehyde mixture To a reactor was charged 444.4 parts m-hydroxyaniline and 222.5 parts methanol. The mixture was heated to reflux (about 75° C.) and held at that temperature until all the m-hydroxyaniline was dissolved. The solution was then cooled to 60° C. and 333.1 parts of the melamine-urea-formaldehyde resin (Melurac 400, a product of American Cyanamid) added. This is a 100% solids spray dried adhesive resin typical of many similar products commercially available intended for hot press or radio frequency bonding of wood products. Resins of this type are described on page 201 of the Vale reference mentioned earlier and are also described in British Patent No. 480,316. On completion of the addition of the melamine-urea-formaldehyde resin the temperature was raised to reflux. Heating was then discontinued although reflux continued through a moderate exothermic reaction for approximately 10 to 15 minutes. When there appeared to be no further exothermic reaction the mixture was cooled to 25° C. The final product had a viscosity between Z1 and Z6 on the Gardner viscosity scale.

Two parts by weight of the above amine-modified polymer were blended with one part by weight of the epoxide-formaldehyde mixture described in Example 6. The gel time of the resulting resin was 15 seconds at 25° C. Cross-lap tests conducted and described in the manner described in Example 6 gave the following results:

| Minutes press time: | Lbs. per sq. in. |
|---|---|
| 2 | 206 |
| 4 | 212 |
| 6 | 200 |
| 8 | 344 |
| 10 | 375 |
| 12 | 410 |

EXAMPLE 10

Preparation of a phenol-formaldehyde resole modified with m-hydroxyaniline as Component A, this resin further modified with an epoxide-aldehyde mixture A phenol-formaldehyde resole was prepared by mixing together 1,187.6 parts of a solution of 50% formaldehyde, 1274.8 parts 91.5% phenol, 344.7 parts water, 90.6 parts methanol, and 75.1 parts 49.6% sodium hydroxide. The temperature rose to 40° after which the mixture was heated from 40 to 65° C. in about 70 minutes and held at that temperature for about 105 minutes. About 32.3 parts formic acid was then added. At that time 1368.0 parts additional formaldehyde (50.1 weight percent) and 106.2 parts water were added and the mixture cooled. The resin had a pH of 8.0 and a viscosity between E and F on the Gardner viscosity scale, a formaldehyde-phenol molar ratio of reactants of 3.4 with approximately 20% by weight of free formaldehyde.

To a second reactor was added 444.4 parts m-hydroxyaniline and 222.5 parts methanol. The mixture was heated to reflux (about 75° C.) and held under reflux until all of the m-hydroxyaniline had dissolved. The solution was then cooled to 60° C. and 333.1 parts of the phenol-formaldehyde resole polymer whose preparation was described above, added slowly while maintaining the heat of reaction between 60° C. and 65° C. After all of the resin had been added and the exothermic reaction subsided, the mixture was cooled to 25° C. and removed to storage. The resin had a final viscosity of E at 25° C. on the Gardner viscosity scale.

Two parts by weight of the amine-modified phenolic resole polymer were blended with 1 part by weight of the epoxide-formaldehyde mixture described in Example 6. The resin had a gel time of 10 seconds at 25° C. Cross-lap tests, conducted in the same manner as described in Example 6, gave the following results:

| Minutes press time: | Lbs. per sq. in. |
|---|---|
| 2 | 188 |
| 4 | 344 |
| 6 | 363 |
| 8 | 325 |
| 10 | 413 |
| 12 | 394 |

EXAMPLE 11

A phenol-formaldehyde polymer was made by mixing together the following components:

| | Parts by weight |
|---|---|
| Phenol | 42.06 |
| Water | 4.51 |
| Paraformaldehyde | 11.35 |
| Calcium acetate monohydrate | 0.46 |

The mixture was brought to reflux (approximately 109° C.) in about 60 minutes at a uniform rate and held at reflux for 120 minutes. To 100 grams of this phenol-formaldehyde prepolymer was then added 0.305 mole of 4-amino-2-hydroxybenzoic acid. The mixture was refluxed for 2.25 hours, cooled, and 26.3 grams methanol stirred into the mixture.

Adhesives were formulated using two different epoxy compounds; an epoxy resin made by the epoxidation of a phenol-formaldehyde novolac having an average of 2.2 epoxy groups per molecule and a low viscosity diglycidyl ether of bisphenol A having an epoxy equivalent wt. of 182–189. The components of the resin mixture were formulated as follows:

Component A:

| | Weight percent |
|---|---|
| 4-amino-2-hydroxybenzoic acid resin prepared as described above | 4.76 |
| Conc. hydrochloric acid | 4.76 |

Component B:

| | |
|---|---|
| 55% formaldehyde in methanol-water solution | 49.08 |
| Asbestos | 1.84 |
| A low viscosity diglycidyl ether of bisphenol A having an epoxy equiv. wt. of 182–189 and a viscosity of 7000–10,000 cps. at 25° C. | 49.08 |

Two parts of Component A were blended with one part of Component B. The resulting adhesive composition was spread on a Douglas fir board, a cross-lap board laid over the adhesive and the two boards pressed together at 40 p.s.i. for 12 minutes. At the end of 12 minutes the tensile strength necessary to separate the cross-laps was 330 lbs. per square inch.

A second adhesive composition was prepared using an epoxidized phenol-formaldehyde novolac instead of the diglycidyl ether of bisphenol A expoxide compound. The adhesive composition was formulated as follows:

Component A:
                                                    Weight percent
  4-amino-2-hydroxybenzoic acid resin prepared as described above _____ 95.24
  Conc. hydrochloric acid _____ 4.76

Component B:
  55% formaldehyde in methanol-water solution _____ 49.08
  Asbestos _____ 1.84
  Epoxy resin made by the epoxidation of a phenol-formaldehyde novolac, the epoxide resin having an average of 2.2 epoxy groups per molecule _____ 49.08

Two parts by weight of Component A were blended together with one part by weight of Component B and the mixture spread on a Douglas fir board, a cross-lap board laid over the adhesive and the two boards pressed together for 12 minutes at 40 lbs. per square inch. The tensile strength necessary to separate the two boards after 12 minutes was 262 lbs. per square inch.

EXAMPLE 12

In addition to the two epoxy compounds used in Example 11 an epoxidized polyglycol was used in formulating an adhesive resin composition. The first component was a phenol-formaldehyde prepolymer prepared according to Example 1 modified with m-hydroxyaniline. Component A and Component B of the respective resins had the following compositions:

(1) Epoxidized phenol-formaldehyde novolac

Component A:                                   Wt. percent
  m-Hydroxyaniline resin of Example 3 _____ 95.04
  Concentrated hydrochloric acid _____ 3.48
  Asbestos _____ 1.48
Component B:
  55% formaldehyde in methanol-water solution _____ 49.08
  Asbestos _____ 1.84
  An epoxidized phenol-formaldehyde novolac, the epoxide resin having an average of 2.2 epoxy groups per molecule _____ 49.08

(2) Diglycidyl ether of bisphenol

Component A:                                     Wt. percent
  m-Hydroxaniline resin of Example 3 _____ 95.04
  Concentrated hydrochloric acid _____ 3.48
  Asbestos _____ 1.48
Component B:
  55% formaldehyde in methanol-water solution _____ 49.08
  Asbestos _____ 1.84
  A low viscosity diglycidyl ether of bisphenol "A" having an epoxy equivalent weight of 182–189 and a viscosity of 7000–10,000 cps. at 25° C. _____ 49.08

(3) Diglycidyl ether of propylene glycol

Component A:                                     Wt. percent
  m-Hydroxyaniline resin of Example 3 _____ 95.04
  Concentrated hydrochloric acid _____ 3.48
  Asbestos _____ 1.48
Component B:
  5% formaldehyde in methanol-water solution _____ 49.08
  Asbestos _____ 1.84
  Diglycidyl ether of propylene glycol having an epoxy equivalent of 364–380 and a viscosity of 2500–4500 cps. at 25° C. _____ 49.08

Cross-laps conducted as described previously using the three adhesive resins gave the following results:

| | Press time, min. | Tensile strength, p.s.i. |
|---|---|---|
| Epoxidized phenol-formaldehyde novolac | 2 | 662 |
| | 6 | 296 |
| | 12 | 430 |
| Diglycidyl ether of bisphenol 'A' | 2 | 256 |
| | 6 | 360 |
| | 12 | 460 |
| Diglycidyl ether of propylene glycol | 4 | 185 |

EXAMPLE 13

A number of resins were prepared using various amines, aldehyde condensation polymers and epoxy compounds with the results reported in Table I. In experiments 1 to 11 the phenolformaldehyde polymer used to react with the specified amines was prepared as described in Example 1. In each case a mixture of 100 grams of the phenolic polymer and 0.305 mole of the amine were refluxed in a reactor for 2.25 hours, cooled and 26.3 grams methanol mixed into the reaction product. The cross-lap tests were carried out by spreading an adhesive resin composition made by mixing 10 grams of the amine-modified phenolic resin with the specified amount of concentrated hydrochloric acid to adjust the pH and 5 grams of the epoxy-formaldehyde mixture on a wood piece and laying a second wood piece on the first piece.

In experiments 12 to 18, 10 grams of amine, 30 grams of the urea-formaldehyde resin and 5.0 grams of N,N-dimethylformamide were mixed and warmed until the amine dissolved and reacted. The adhesive resin composition was made by blending 10.0 grams of the amine-modified urea-formaldehyde resin with (1) the specified amount of concentrated hydrochloric acid to adjust the pH and (2) 5.0 gm. of the epoxy-formaldehyde mixture specified in the table.

In experiments 19 and 22, 20 gm. of the amine was charged to a reaction vessel and 40 gm. N,N-dimethylformamide added with stirring. When a uniform mixture was obtained 60 gm. of the melamine-urea formaldehyde polymer was added with gentle heating. At this point 25 gm. of a 55% formaldehyde in methanol-water solution was added in increments. After all evidence of reaction had ceased the reaction product was cooled. In experiments 20 and 21 only 20 gm. of N,N-dimethylformamide was used and no additional aldehyde was added. The adhesive resin composition was prepared by blending 10 grams of the amine-modified resin, the specified amount of concentrated hydrochloric acid to adjust the pH, and 5 grams of the epoxy-formaldehyde mixture specified. The compositions were used in cross-lap tests as described previously.

TABLE I

| | 1st component (A) | | 2d component (B), epoxy-aldehyde mixture | pH Adjustment[1] | Gel time, seconds | Press time, min. | Tensile break, p.s.i. |
|---|---|---|---|---|---|---|---|
| | Amine | Aldehyde condensation polymer | | | | | |
| 1 | 2,4-diaminoacetanilide | Phenol-formaldehyde polymer of Example 1. | Epoxidized phenol-formaldehyde novolac of Example 2. | 0.0 | 15 | 12 | 45 |
| 2 | do | do | Epoxidized polyglycol of Example 12 | 0.0 | 10 | 12 / 4 | 55 / 12 |
| 3 | 1,8-diaminonaphthalene | do | Epoxidized phenolic novolac of Example 2. | 0.0 | 12 | 8 / 12 | 70 / 140 |
| 4 | do | do | Epoxidized polglycol of Example 12 | 0.0 | 20-25 | 12 | 50 |
| 5 | 4,4' methylenedianiline | do | Epoxidized phenolic novolac of Example 2. | 0.0 | 10 | 12 | 100 |
| 6 | 4,4' oxydianiline | do | do | 0.0 | 90 | 12 | 130 |
| 7 | m-Xylylenediamine | do | do | 1.2 | 45 | 12 | 65 |
| 8 | 2,6-diaminopyridine | do | do | 0.0 | 25 | 3 / 4 | 115 / 195 |
| 9 | 1-amino-5-naphthol | do | do | 0.0 | 180 | 12 | 270 |
| 10 | 4,4'-methylenedianiline | do | Epoxidized polyglycol of Example 12 | 0.0 | 45 | 4 / 6 | 10 / 105 |
| 11 | 1,3,5-triaminobenzene | do | Epoxidized phenolic novolac of Example 2. | 0.0 | 210 | 12 | 85 |
| 12 | 2,4-diaminoacetanilide | Urea-formaldehyde polymer of Example 8. | do | 0.8 | <10 | 12 | 45 |
| 13 | 1,8-diaminonaphthalene | do | do | 0.6 | [2] 5 | 12 | 50 |
| 14 | 4,4' methylenedianiline | do | do | 0.5 | 210 | 15 | 140 |
| 15 | 4,4' oxydianiline | do | do | 1.0 | 220 | 12 | 90 |
| 16 | 2,6-diaminopyridine | do | do | 0.2 | 5 | 4 | 145 |
| 17 | 1,5-diaminonaphthalene | do | do | 0.5 | 5-10 | 4 | 115 |
| 18 | do | do | Epoxidized polyglycol of Example 12 | 0.4 | 5 | 4 | 30 |
| 19 | 2,4-diaminoacetanilide | Melamine-urea-formaldehyde polymer of Example 9. | Epoxidized phenolic novolac of Example 2. | 0.3 | 10 | 4 | 145 |
| 20 | 4,4'-methylenedianiline | do | do | 0.5 | 205 | 12 | 310 |
| 21 | m-Xylylenediamine | do | do | 1.5 | 20 | 12 | 110 |
| 22 | 2,6-diaminopyridine | do | do | 0.5 | 15 | 4 / 6 | 70 / 140 |

[1] Concentration HCl, parts HCl per 10 parts component A.
[2] Approximately.

What is claimed is:
1. In a rapid curing resin composition comprising (A) the reaction product of
(1) one part by weight of an aldehyde condensation polymer having reactive alkylol groups, said aldehyde condensation polymer being selected from the group consisting of phenoplasts, aminoplasts, and ketone-aldehyde condensation polymers, said aldehyde condensation polymer further being one prepared from an aldehyde selected from the group consisting of (i) monofunctional aldehydes, and (ii) polyfunctional aldehydes having at least two aldehyde groups separated at most by one carbon atom; with
(2) from about 0.05 to 2.0 parts by weight of a nitrogen compound selected from the group consisting of:
(a) primary aromatic amines having the formula:

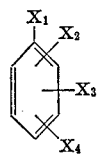

where:
$X_1$ is

—$NH_2$
—$CH_2NH_2$ $X_2$ is

—$X_1$
—OH
—alkoxy $X_3$ is

—$X_1$
—COOH
—$NO_2$
—alkoxy
—OH
—NHCOCH_3
—H

—halogen
—halogenated alkyl
—$C_1$ to $C_5$ alkyl $X_4$ is

—$C_1$ to $C_4$ alkyl
—H
—aryl and
A is

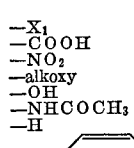

—$SO_2$—
—NH—
—O—
—S—
—C=C—
—S—S—
—N=N— where $Y_1$ and $Y_2$ are hydrogen or alkyl radicals having from 1 to 3 carbon atoms and Z is an integer from 0 to 2;

(b) bis(aminoaryl compounds) having the formula:

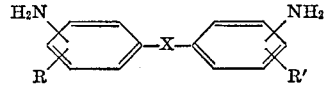

where
R and R' are alkoxy, amino, hydrogen, hydroxyl, nitro, carboxyl or $C_1$ to $C_4$ alkyl
and
X is

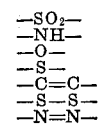

—$SO_2$—
—NH—
—O—
—S—
—C=C—
—S—S—
—N=N— where $Y_1$ and $Y_2$ are hydrogen or alkyl radicals having from 1 to 3 carbon atoms and Z is an integer ranging from 0 to 2;

(c) primary aminonaphthalenes having the formula:

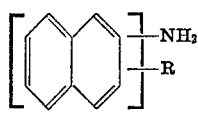

where R may be amino in any open ring position or hydroxyl in the 2, 5 and 8 ring positions when the amino group is in the 1 position; and (d) five and six-membered heterocyclic nitrogen-containing compounds selected from the group consisting of 2,3-, 2,4-, 2,6- and 3,4-diaminopyridine; 4,6-diaminopyrimidine; pyrrole; 2,4-dimethylpyrrole and N-methylpyrrole;

the improvement comprising (B) a curing agent comprising an epoxide-aldehyde mixture, the epoxide being present in an amount from about 10 to about 50 parts by weight of epoxide resin to about 90 to 50 parts by weight of the reaction product (A), said aldehyde portion of said epoxide-aldehyde mixture comprising an aldehyde having from 1 to 8 carbon atoms the amount of aldehyde in the mixture being present in an amount of 0.2 to 2.0 parts by weight aldehyde per part of the reaction product of (A).

2. The composition according to claim 1 wherein said epoxide in said curing agent comprises a polyglycidyl ether of a polyhydric phenol.

3. The composition according to claim 1 wherein said epoxide in said curing agent comprises a polyglycidyl ether of a phenolformaldehyde condensate.

4. The composition according to claim 1 wherein said epoxide in said curing agent comprises a polyglycidyl ester derived from an aliphatic or aromatic dicarboxylic acid.

5. The composition according to claim 2 wherein said polyhydric phenol comprises 2,2-bis-(p-hydroxyphenyl) propane.

6. The composition according to claim 1 wherein said aldehyde condensation polymer is one selected from the group consisting of formaldehyde condensed with phenol, oxylenol, cresol, urea, melamine-urea, acetone, melamine, phenol-resorcinol and resorcinol.

7. The composition according to claim 1 wherein said aldehyde condensation polymer comprises a phenol-formaldehyde polymer.

8. The composition according to claim 1 wherein said aldehyde condensation polymer comprises a urea-formaldehyde polymer.

9. The composition according to claim 1 wherein said aldehyde condensation polymer comprises an acetone-formaldehyde polymer.

10. The composition according to claim 1 wherein said nitrogen compound comprises a hydroxyaniline.

11. The composition according to claim 1 wherein said nitrogen compound comprises a phenylenediamine.

12. The composition according to claim 1 wherein said nitrogen compound comprises 2,6-diaminopyridine.

13. The composition according to claim 1 wherein said nitrogen compound comprises 1,5-diaminonaphthalene.

14. The composition according to claim 1 wherein the nitrogen compound comprises 4,4'-methylenedianiline.

15. In a process for preparing a rapid curing resinous composition which comprises (a) reacting
(i) one part by weight of an aldehyde condensation polymer having reactive alkylol groups, said aldehyde condensation polymer being selected from the group consisting of phenoplasts, aminoplasts, and ketone-aldehyde condensation polymers, said aldehyde condensation polymer further being one prepared from an aldehyde selected from the group consisting of (i) monofunctional aldehydes, and (ii) polyfunctional aldehydes having at least two aldehyde groups separated at most by one carbon atom, with (ii) from about 0.05 to 2.0 parts by weight of a nitrogen compound from the group consisting of:

(1) primary aromatic amines having the formula:

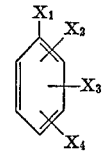

where:
$X_1$ is

$X_2$ is

$X_3$ is

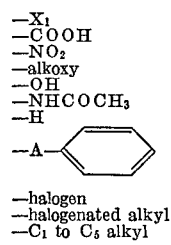

$X_4$ is $C_1$ to $C_4$ alkyl
—H
—aryl and A is

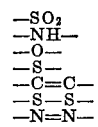

where $Y_1$ and $Y_2$ are hydrogen or alkyl radicals having from 1 to 3 carbon atoms and Z is an integer from 0 to 2;

(2) bis(aminoaryl) compounds having the formula:

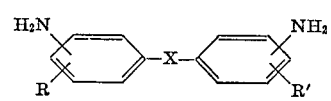

where
R and R' are alkoxy, amino, hydrogen, hydroxyl, nitro, carboxyl or $C_1$ to $C_4$ alkyl and
X is

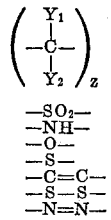

where $Y_1$ and $Y_2$ are hydrogen or alkyl radicals having from 1 to 3 carbon atoms and Z is an integer ranging from 0 to 2;

(3) primary aminonaphthalenes having the formula:

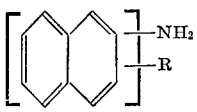

where R may be amino in any open ring position or hydroxyl in the 2, 5 and 8 ring positions when the amino group is in the 1 position; and (4) five and six-membered heterocyclic nitrogen-containing compounds selected from the group consisting of 2,3-, 2,4-, 2,6-, and 3,4-diaminopyridine; 4,6 - diaminopyrimidine; pyrrole; 2,4-dimethylpyrrole and N-methylpyrrole, to form a modified polymer; and the improvement which comprises:
(b) blending with the product of (a) a curing agent comprising an epoxide-aldehyde mixture, the epoxide being present in an amount from about 10 to about 50 parts by weight of epoxide resin to about 90 to 50 parts by weight of the reaction product of (A), said aldehyde portion of said epoxide-aldehyde mixture comprising an aldehyde having from 1 to 8 carbon atoms the amount of aldehyde in the mixture being present in an amount of 0.2 to 2.0 parts by weight aldehyde per part of the reaction product of (A).

16. The process according to claim 15 wherein said epoxide in said curing agent comprises a polyglycidyl ether of 2,2-bis(p-hydroxy-phenyl)propane.

17. The process according to claim 15 wherein said aldehyde condensation polymer is one selected from the group consisting of formaldehyde condensed with phenol, xylenol, cresol, urea, melamine-urea, acetone, melamine, phenol-resorcinol and resorcinol.

18. A process for preparing a rapidly curing resin composition which comprises
(a) reacting
(i) one part by weight of a phenol-formaldehyde polymer with
(ii) 0.05 to 2 parts by weight of an amine selected from the group consisting of m-hydroxyaniline, a phenylenediamine, 1,5-diaminonaphthalene, 2,6-diaminopyridine and 4,4'-methylenedianiline, and
(b) blending therein a solution of formaldehyde and an epoxide, the epoxide being present in an amount of from about 10 to about 50 parts by weight of epoxide resin to about 90 to 50 parts by weight of the reaction product of (a), and the formaldehyde being present in an amount ranging from 0.02 to 2.0 parts by weight per part of the reaction product of (a).

19. The process according to claim 18 wherein said epoxide comprises a polyglycidyl eter of a polyhydric phenol.

20. The process according to claim 18 wherein said epoxide comprises a polyglycidyl ether of a phenol-formaldehyde condensate.

21. The process according to claim 18 wherein said epoxide comprises a polyglycidyl ester derived from an aliphatic dicarboxylic acid or an aromatic dicarboxylic acid.

22. The process according to claim 19 wherein said polyhydric phenol comprises 2,2-bis(p-hydroxyphenyl) propane.

References Cited
UNITED STATES PATENTS

| | | | |
|---|---|---|---|
| 2,839,487 | 6/1958 | Rosamilia | 260—828 |
| 3,186,969 | 6/1965 | Cox | 260—51.5 |
| 3,513,221 | 6/1970 | Huang | 260—830 |
| 3,518,159 | 6/1970 | Freeman | 161—258 |
| 2,475,587 | 7/1949 | Bender | 260—57 |
| 2,839,481 | 6/1958 | Harvey | 260—19 |
| 3,436,373 | 4/1969 | Cox | 260—51.5 |
| 3,461,099 | 8/1969 | Muzyczko | 260—59 |

FOREIGN PATENTS 615,335   1/1949   Great Britain.

PAUL LIEBERMAN, Primary Examiner

U.S. Cl. X.R.

156—330, 335; 161—184, 185; 260—37 Ep, 831, 834